March 18, 1924.
J. T. HOHL
1,487,062
WASHING MACHINE FOR VEHICLES
Filed Sept. 9, 1921   3 Sheets-Sheet 3
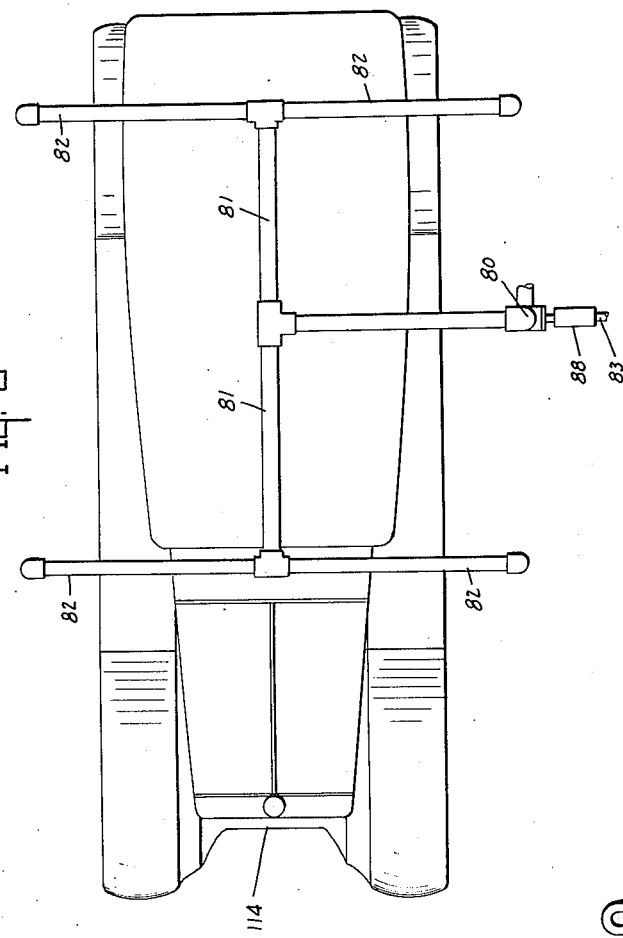
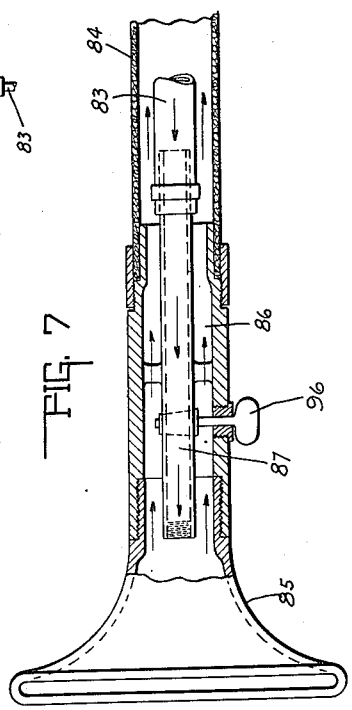
INVENTOR.
JOHN T. HOHL.
BY
ATTORNEYS.

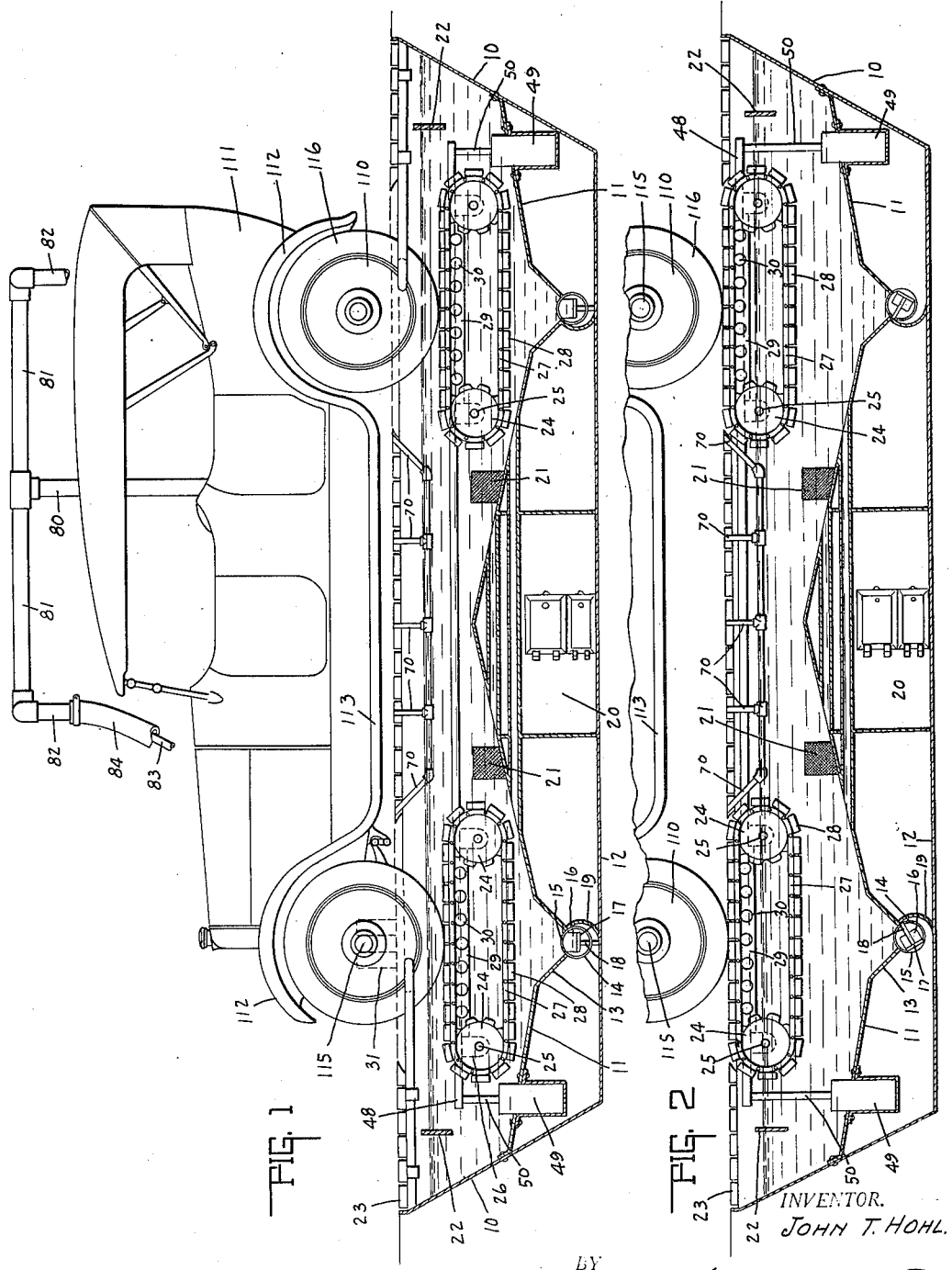

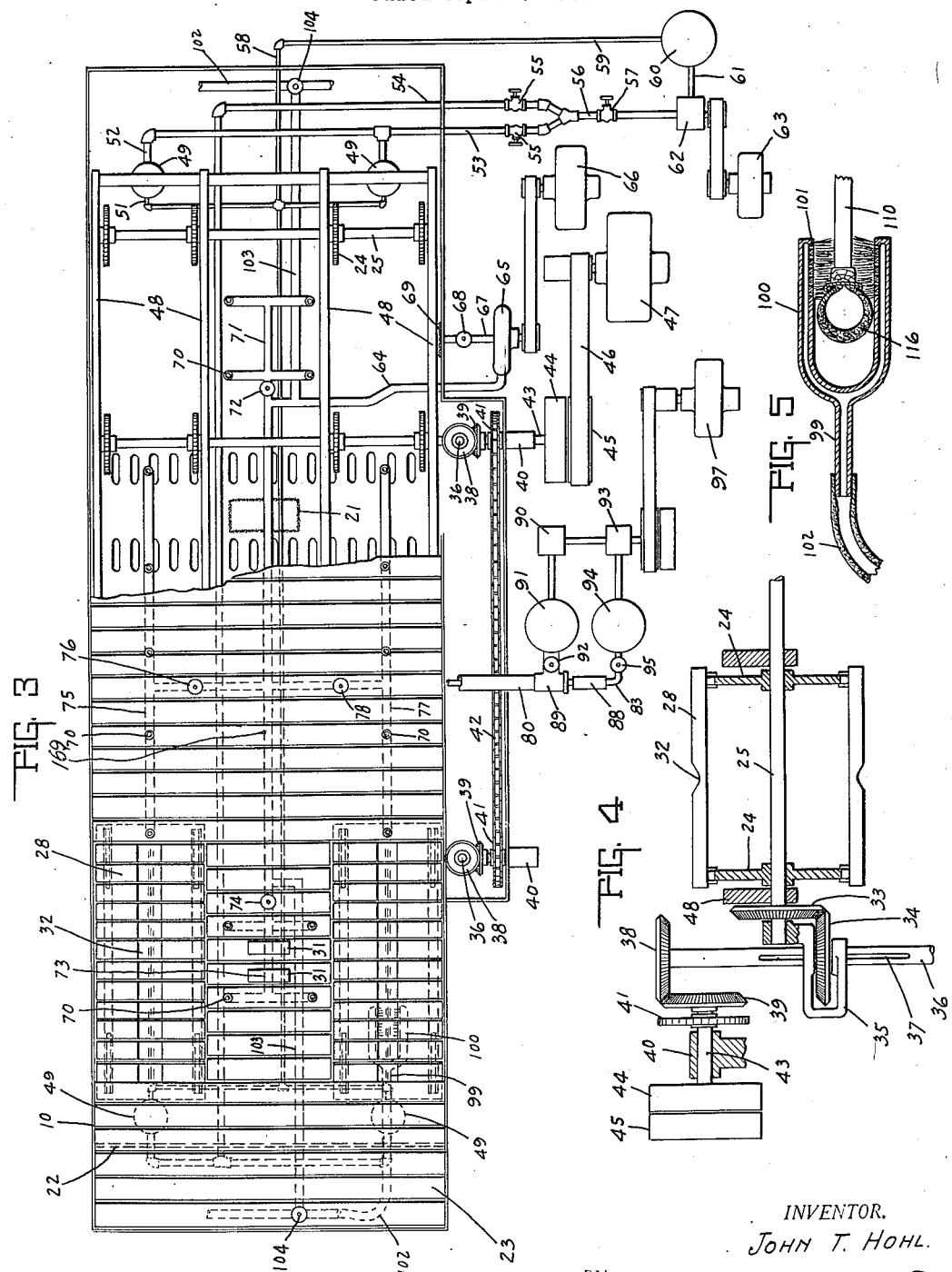

Patented Mar. 18, 1924.

1,487,062

UNITED STATES PATENT OFFICE.

JOHN T. HOHL, OF INDIANAPOLIS, INDIANA.

WASHING MACHINE FOR VEHICLES.

Application filed September 9, 1921. Serial No. 499,436.

*To all whom it may concern:*

Be it known that I, JOHN T. HOHL, a citizen of the United States, and a resident of Indianapolis, county of Marion, and State of Indiana, have invented a certain new and useful Washing Machine for Vehicles; and I do hereby declare that the following is a full, clear, and exact description thereof, reference being had to the accompanying drawings, in which like numerals refer to like parts.

This invention relates to a machine for cleaning, and particularly for washing vehicles such as automobiles of the passenger and truck types.

The chief object of the invention is to provide means which is adapted to be associated with a vehicle so that the latter may be completely cleaned without utilizing any of the motive parts of the vehicle, if a motor vehicle.

Another object of the invention is to provide a compact construction which is adapted to accommodate vehicles of different sizes.

The chief feature of the invention consists in utilizing the rotary motion of the vehicle wheels for moving a cleaning fluid so that said wheels, the fenders and mud guards may be cleaned thereby.

Another feature of the invention consists in the elevator type of support for the vehicle, whereby the vehicle after it has been positioned upon the cleaning machine may be partially immersed so that the wheels may be rotated to transport the cleaning fluid to the desired position.

Another feature of the invention consists in the means for preventing the movement of the vehicle when the wheels are rotated.

A further feature of the invention consists in the provision of means for spraying and cleaning the vehicle by means of the fluid through suitable directing conduits.

Still a further feature of the invention consists in the provision of means for separating from said cleansing fluid the oil and grease removed from the vehicle by the action of the cleansing fluid, and the provision of other means for permitting the removal of the dirt and the other material from the washing machine without necessitating the complete removal of the cleansing fluid.

The full nature of the invention will be understood from the accompanying drawings and the following description and claims.

In the drawings, Fig. 1 is a side elevational view with parts shown in section, showing the invention associated with a motor vehicle, the latter being shown in the position for washing purposes. Fig. 2 is a similar view of the washing machine showing the vehicle supporting means in the elevated position prior to immersion. Fig. 3 is a top plan view of the invention with the vehicle removed therefrom and a portion of the platform and vehicle supporting means removed to show other parts in detail. Fig. 4 is an enlarged elevational view of a portion of the driving mechanism, whereby the vehicle wheels are revolved. Fig. 5 is a cross sectional view of the wheel cleaning brush. Fig. 6 is a top plan view of a motor vehicle associated with the cleaning and drying connections. Fig. 7 is an enlarged longitudinal sectional view of one of the nozzles associated with the cleaning means shown in Figs. 1 and 5.

In the drawings 10 indicates the sides of a substantially rectangular tank, herein shown provided with an inclined sub-base 11 and a supporting base 12. Herein the base 11 is provided with a plurality of troughs 13 associated with which is a cylindrical valve member 14. The cylindrical valve member 14 closes the opening 15 in the trough-like bottom 13 of the base 11. Said cylindrical valve 14 has a rectangular groove 16 extending therethrough and the base of said groove constitutes a movable bottom 17 carrying one or more piston rods or pins 18. Adjacent the opening 15 and extending downwardly from the same is an arcuate cam member 19. When the valve 14 is in the position shown in Fig. 1, the dirt and sediment drains into the trough-like bottom 13 and collects in the rectangular channel 16. The cylindrical valve 14 thereupon may be rotated, and in its rotation, the stems 18 of the bottom 17 of the rectangular trough 16 engage the arcuate eccentric circular cam 19, so that when the cylindrical valve 14 is rotated, as shown in Fig. 2, the piston rods 18 will have moved the piston or bottom 17 outwardly to discharge the collection of sediment and dirt, and at the same time close the opening 15 so that the cleansing fluid in the upper portion of the tank will be retained therein.

Suitably supported beneath the bottom 11 is a furnace 20 for maintaining the cleansing fluid at the desired temperatures, and herein there is shown positioned upon the base 11 suitable mesh containers 21 adapted to receive soap and the like to aid in the cleansing process. Extending across the tank and at each end thereof, but spaced from said ends, is a transverse baffle plate 22 which projects slightly above the quiet level of the cleansing fluid and extends into the same a suitable distance. It will be understood that when the cleansing fluid is circulated, the grease and oil will be carried in suspension by the fluid and in said circulatory movement, the grease and oil will be projected over the baffle plate 22 at the respective end, depending upon the circulation, and said oil and grease will be trapped by the end of the tank by said baffle plate.

Reference will now be had to Figs. 1 and 3. Herein the tank is shown provided with a platform or closure which consists of a plurality of separated treads or slats 23 suitably supported by the sides of the tank. It will be understood that the end slats 23 are removably supported by the tank, in order that the grease retained by the baffle plate 22 may be removed from the tank at suitable intervals. In the present embodiment of the invention the platform 23 consists of two end sections and an intermediate section; while the two openings between the end and intermediate sections are closed by movable vehicle wheel supporting means, whereby the vehicle wheels may be rotated and the vehicle supported thereby.

Herein the openings in the platform 23 are closed by an endless chain construction or caterpillar tread, including a pair of spaced sprocket wheels 24 upon the shafts 25 supported in the brackets 26, and said sprocket wheels engage the teeth in the sprocket chain 27 to which is suitably secured a plurality of transversely extending treads or slats 28. In order to reenforce the chain and tread adjacent the vehicle wheel supporting portion, the framework of each vehicle wheel supporting construction extends longitudinally at 29 and rotatably supports a plurality of rollers 30 for carrying the load. It will be understood that each of the vehicle wheels is supported by a caterpillar or endless belt construction, each of which includes two pairs of sprocket wheels 24.

From the drawings, particularly Figs. 1 and 2, it will be noted that each caterpillar construction is movable from the position shown in Fig. 2, wherein the same lies substantially in the plane of the platform 23 to receive the vehicle when the same is pushed thereon, into the position shown in Fig. 1, which immerses a portion of the vehicle wheels 110 of a vehicle 111. The vehicle 111 is provided with the usual fenders or mud guards 112 and the running board 113, as well as the under pans 114, not shown, which extend rearwardly through the automobile in the customary manner. Suitable longitudinal movement preventing means is provided and herein is shown associated with but one end of the device, although both ends may be provided with the same, and said means is adapted to engage the vehicle. Herein the same is illustrated as engaging the axle 115 of the vehicle to prevent the movement of the vehicle on the platform when the wheels 110 are revolved by the movable caterpillar supports. Said means comprises a pair of blocks 31, and it will be understood that as the vehicle is lowered into washing position, the blocks 31 engage the axle and prevent longitudinal movement of the vehicle upon the platform. In order to prevent transverse movement or creeping of the vehicle, each of the treads 28 in the caterpillar construction is grooved, as at 32, to receive the tire 116 on the vehicle wheel. Other transverse movement preventing means may be substituted if desired.

The means for driving the shafts 25 for driving the caterpillar constructions includes the elongated shafts 25 and the mitre gear 33 meshing with another mitre gear 34. The mitre gear 34 is mounted in a bracket 35 which rotatably supports the shaft 25 and is movable therewith. The bracket 35 surrounds the shaft 36 and rotatably supports the same. The shaft 36 is provided with an elongated slot 37 and the gear 34 is provided with a complementary portion, such as a spline or key seatable in said slot, whereby the gear 34 will be rotated with the shaft 36 to rotate the shafts 25, and thereby drive the caterpillar constructions. Each shaft 36 carries a bevel gear 38, which meshes with another bevel gear 39 upon a shaft 40. The shaft 40 also supports a pulley 41, and the pulleys 41 are connected together by a belt 42. One of the shafts is elongated as at 43 and carries a driving and loose pulley construction 44 and 45 respectively, with which is associated a belt 46 driven by a motor 47. In this wise, power is transmitted at all times to the caterpillar construction independent of the position thereof.

The means for elevating and lowering the caterpillar constructions is shown somewhat diagrammatically and is herein illustrated as comprising a sub-frame 48 which supports the caterpillar constructions. Adjacent each corner of the rectangular sub-frame 48 is positioned a fluid jack 49 having elevating rods 50 connected with the sub-frame 48. Each of the fluid jacks 49 is provided with an intake 52 and a discharge 51. The jacks at each end are connected in pairs, as shown, and one pair is supplied by the conduit 53; while the other pair is supplied by the conduit 54, each of which is controlled by a valve 55; while the common conduit 56 is controlled by a valve 57. The discharge from the jacks 49 is returned from the discharge outlets 51 by means of the conduits 58, which are connected to a common conduit 59 discharging into a well 60, from which through the conduit 61 by means of the pump 62 driven by the motor 63 fluid is withdrawn from the well and supplied at the desired pressure by means of the regulating valve 55 to the jacks 49.

The means for washing the under portion of the vehicle, and particularly the oil pan and transmission case, etc., and differential housing, as well as the running board, comprises a plurality of conduits supplied by means of a main supply conduit 64 associated with a pressure pump 65 driven by a motor 66. The pressure pump 65 is provided with an intake line 67 controlled by a valve 68, and said intake is provided with screening means 69, whereby the cleansing fluid in the tank 10 may be withdrawn and screened prior to its reception by the pump 65, as shown. The conduit 64 connects with a distributing line or header 169 and the nozzle 70 of the differential cleansing spray 71 is controlled by a valve 72. The oil pan cleansing spray 73 is controlled by the valve 74 and the spray 73 is provided with the usual nozzle 70. Similarly, the right running board spray 75 is provided with similar nozzles 70 and is controlled by a valve 76; while the left running board spray is controlled by a valve 78 and is also provided with the usual nozzle 70. It will be understood that the nozzles 70 are so positioned that they not only cleanse the running board, but also are adapted to cleanse the under side of the fenders or mud guards, see Fig. 1.

Reference will now be had to Figs. 1, 3, 5 and 6. In said figures, it will be noted that at one side of the platform there is secured a pair of concentric pipes which extend upwardly along one side, as at 80, and are branched at 81, each of which are in turn again branched at 82 so as to provide a plurality of stations at each side of the motor vehicle when positioned upon the platform. Each branch 82 is connected by means of a pair of concentric flexible conduits 83 and 84, which are connected, see Fig. 6, to a nozzle 85. The nozzle 85 is a dual construction, providing a return passage 86 for a vacuum construction and a discharge conduit 87 for the air discharging construction. Reference will now be had to Fig. 7, and herein the concentric tubing 80 is shown providing a pressure tube 88 which discharges through the nozzle 87 and a vacuum tube 89 which connects with the channel 86 in the nozzle. The vacuum pump 90 is associated with the usual tank 91, and the system is controlled by a valve 92. Similarly, the pressure pump 93 is associated with a tank 94 and the pressure system 88 is controlled by the valve 95. A suitable valve 96, see Fig. 7, is associated with the conduit 87 to close the same when the vacuum construction is being used, thereby preventing the collection of dirt in the pressure line 83 when the latter is not in use. In Fig. 3 there is diagrammatically illustrated an electric heater 88 which may or may not be connected with the valve 95 as desired, such that the air supplied through the pressure pipes 87 may or may not be preheated by said electrical heating element 88. The pumps 90 and 93 are driven by a suitable motor 97.

The means for cleaning the wheel rim, hub and spokes comprises a bifurcated hollow brush having a tubular handle 99 and the tubular forked brush supports 100 provided with inwardly extending bristles 101 adapted to be positioned upon both sides of the vehicle wheel 110 and tire 116. The tubular handle 99 is connected by means of a flexible conduit 102 with the conduit 103 controlled by a valve 104. It will be understood that the aforesaid construction is duplicated for the front and rear ends of the platform 23. In this manner the cleansing fluid supplied by the pump 65 is adapted to cleanse the vehicle wheel rims, spokes and hubs.

The invention claimed is:

1. A washing machine for automobiles having vehicle wheels and including in combination a tank, movable vehicle supporting means and movably mounted, mechanism for moving said supporting means to immerse the vehicle wheels in the tank, and power means for moving said supporting means to rotate the vehicle wheels within the tank.

2. A washing machine for automobiles having vehicle wheels and including in combination a tank, movable vehicle supporting means and movably mounted, mechanism for moving said supporting means to immerse the vehicle wheels in the tank, power means for moving said supporting means to rotate the vehicle wheels within the tank, and means for separating the grease from the cleansing fluid operable by the action of the vehicle wheels.

3. A washing machine for automobiles having vehicle wheels and including in combination a tank, movable vehicle supporting means and movably mounted, mechanism for moving said supporting means to immerse the vehicle wheels in the tank, power means for moving said supporting means to rotate the vehicle wheels within the tank to cleanse the same and portions of the vehicle adjacent thereto, and means for spraying cleansing fluid upon other portions of the vehicle not cleansed by the fluid associated with the rotating vehicle wheels.

4. A washing machine for automobiles having vehicle wheels and including in combination a tank, movable vehicle supporting means and movably mounted, mechanism for moving said supporting means to immerse the vehicle wheels in the tank, power means for moving said supporting means to rotate the vehicle wheels within the tank to cleanse the same and portions of the vehicle adjacent thereto, means for spraying cleansing fluid upon other portions of the vehicle not cleansed by the fluid associated with the rotating vehicle wheels, and means for controlling the fluid supplied to the spraying means last mentioned.

5. A washing machine for automobiles having vehicle wheels and including in combination a tank, movable vehicle supporting means and movably mounted, mechanism for moving said supporting means to immerse the vehicle wheels in the tank, power means for moving said supporting means to rotate the vehicle wheels within the tank, and means for draining the material removed from the vehicle by the cleansing fluid from the tank without removing the fluid therefrom.

6. A washing machine for automobiles having vehicle wheels and including in combination a tank, movable vehicle supporting means and movably mounted, mechanism for moving said supporting means to immerse the vehicle wheels in the tank, power means for moving said supporting means to rotate the vehicle wheels within the tank to cleanse the same and portions of the vehicle adjacent thereto, means for spraying cleansing fluid upon other portions of the vehicle not cleansed by the fluid associated with the rotating vehicle wheels, means for controlling the fluid supplied to the spraying means last mentioned, and means for draining the material removed from the vehicle by the cleansing fluid from the tank without removing the fluid therefrom.

In witness whereof, I have hereunto affixed my signature.

JOHN T. HOHL.